United States Patent
Park et al.

(10) Patent No.: US 9,622,172 B2
(45) Date of Patent: Apr. 11, 2017

(54) DATA TRANSMISSION METHOD AND ELECTRONIC DEVICE ADAPTED TO THE METHOD

(71) Applicant: Samsung Electronics Co., Ltd., Gyeonggi-do (KR)

(72) Inventors: Kyoungyoup Park, Gyeonggi-do (KR); Jongman Park, Gyeonggi-do (KR); Dongwook Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 222 days.

(21) Appl. No.: 14/628,791

(22) Filed: Feb. 23, 2015

(65) Prior Publication Data
US 2015/0245288 A1 Aug. 27, 2015

(30) Foreign Application Priority Data
Feb. 24, 2014 (KR) ........................ 10-2014-0021461

(51) Int. Cl.
G08C 17/00 (2006.01)
H04W 52/02 (2009.01)
H04W 76/06 (2009.01)

(52) U.S. Cl.
CPC ..... *H04W 52/0209* (2013.01); *H04W 76/068* (2013.01)

(58) Field of Classification Search
None
See application file for complete search history.

(56) References Cited

U.S. PATENT DOCUMENTS

| 8,675,544 B1* | 3/2014 | Hirsch | H04B 7/2656 370/322 |
| 2012/0170496 A1 | 7/2012 | Yang et al. | |
| 2015/0009815 A1* | 1/2015 | Hsu | H04W 28/0221 370/230.1 |

FOREIGN PATENT DOCUMENTS

KR 10-2012-0076859 A 7/2012

* cited by examiner

*Primary Examiner* — Kenny Lin
(74) *Attorney, Agent, or Firm* — Cha & Reiter, LLC.

(57) ABSTRACT

A data transmission method is provided that can increase an amount of time that an electronic device has been in use and minimize the side effects. An electronic device adapted to the method is also provided. The data transmission method includes: recognizing a data transmission request of at least one first application; determining whether a first timer according to the data transmission request is within a second timer (a data detecting timer) where a data request of a second application required for network access is detected; and transmitting, when the first timer is within the second timer, request data related to the second application and user data of the first application by using at least part of the second timer and the first timer.

20 Claims, 11 Drawing Sheets

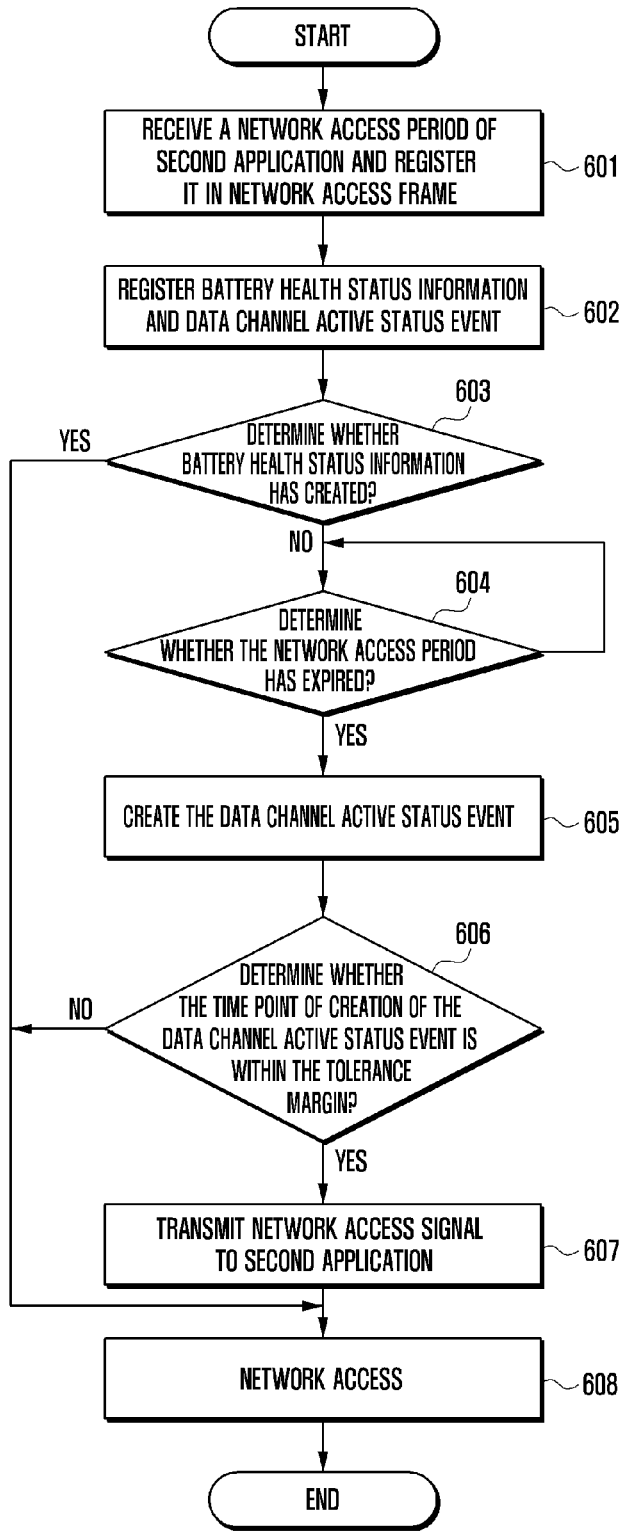

FIG. 7B
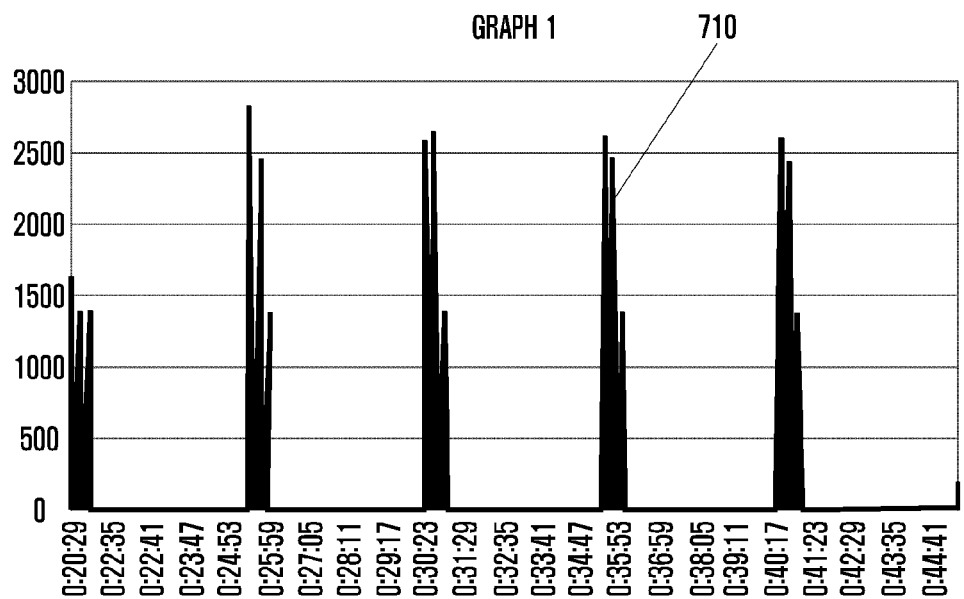
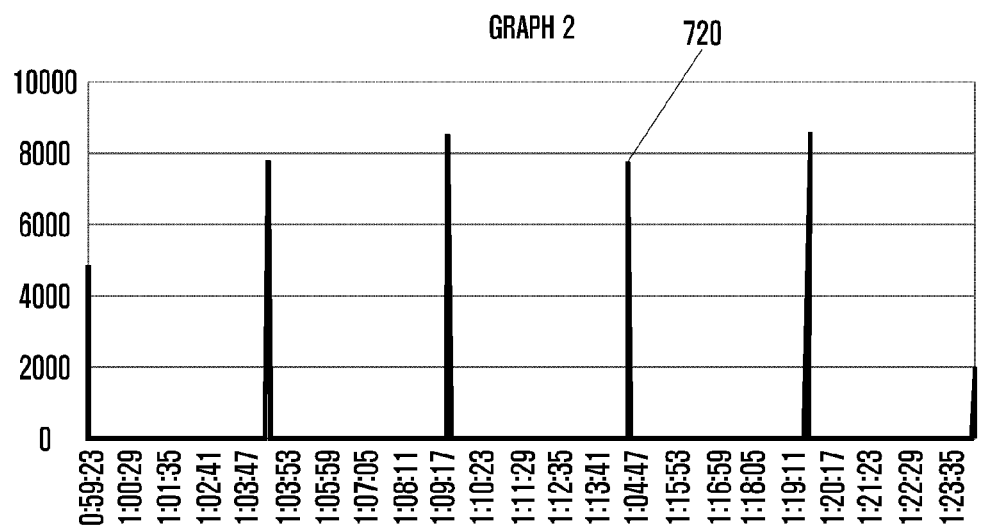

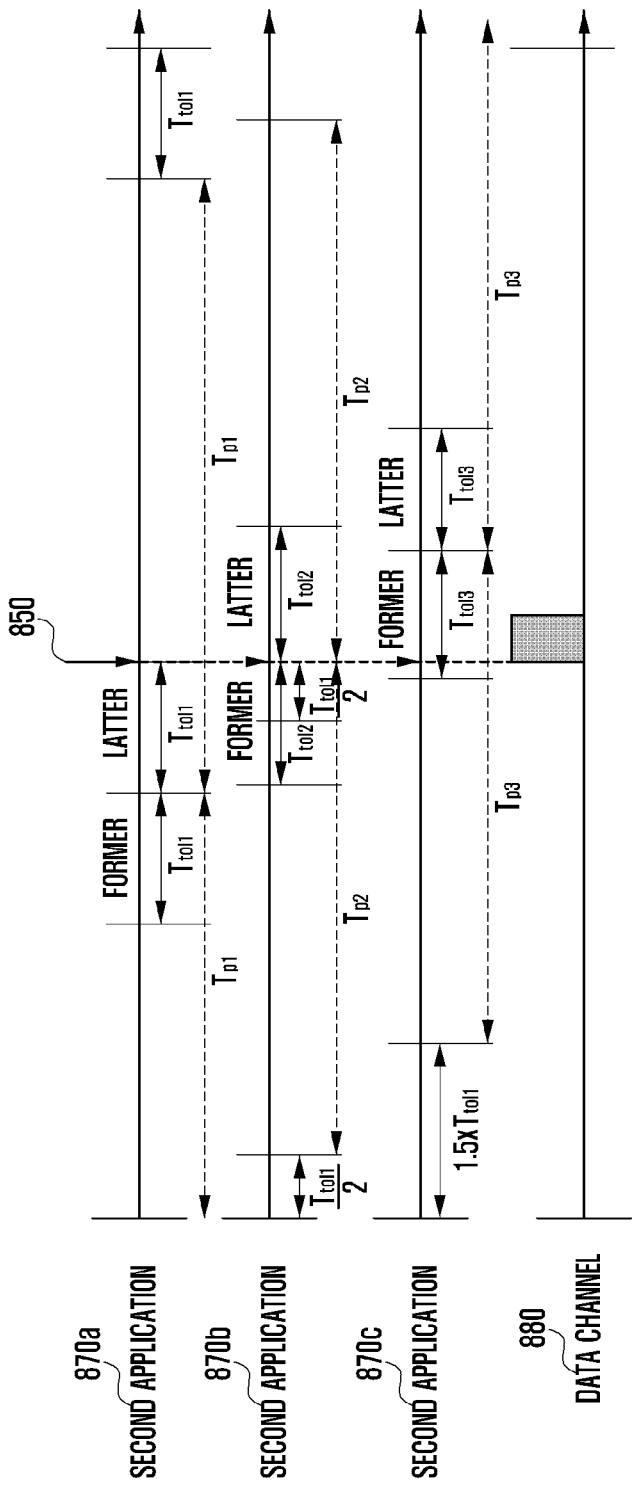

DATA TRANSMISSION METHOD AND ELECTRONIC DEVICE ADAPTED TO THE METHOD

CROSS REFERENCE TO RELATED APPLICATION

This application claims the benefit under 35 U.S.C. §119(a) of a Korean patent application filed on Feb. 24, 2014 in the Korean Intellectual Property Office and assigned Serial No. 10-2014-0021461, the entire disclosure of which is hereby incorporated by reference.

TECHNICAL FIELD

The present disclosure relates to a method for transmitting application-related data according to periodic access events to a network and an electronic device adapted to the method.

BACKGROUND

In recent years, a variety of electronic devices have been released on the market and increased in their application fields. Examples of the electronic device are mobile electronic devices, smart phones, cellular phones, radios, laptop computers, wireless communication devices, etc. In particular, smart phones have been developed to provide a number of services and this has led to provide a basis to develop a variety of applications executable thereon. Unlike conventional electronic devices that have only executed the built-in applications, Smart phones can execute the built-in applications and also allow users to install any applications that they need and to execute them.

Most applications for smart phones transmit/receive data through a network and utilize data in various patterns according to their features. For example, background applications, such as, emails, weather, calendar, etc., periodically upload data via networks.

Uploading or downloading data refers to an operation for exchanging data in wireless mode between electronic devices and a server. During the process, the electronic device consumes the battery power.

Applications installed to electronic devices utilize data transmission. Most of the applications perform a periodic data transmission through networks. Applications executing on electronic devices may repeat data transmissions at preset periods, respectively, regardless of whether the user utilizes data. This prevents electronic devices from operating in an idle status where it consumes battery power minimally, thereby increasing the battery power consumption.

Therefore, reducing an amount of time that the electronic device exits an idle state and operates in normal state may decrease battery power consumption. To this end, electronic devices often disable the display or execute a standby state when there is no user operation and data transmission for any application. This conventional data transmission method may make a determination as to whether the user is actively using the electronic device.

The conventional data transmission method, however, brings about side effects. When the electronic device is configured such that data cannot be transmitted in a low-power state where the display of the electronic device is disabled or the electronic device is in standby without considering the characteristics of executing applications, it may cause user inconvenience.

SUMMARY

In accordance with an exemplary embodiment of the present invention, the present invention provides a data transmission method of an electronic device including: recognizing a data transmission request of at least one first application; determining whether a first timer according to the data transmission request is within a second timer (a data detecting timer) where a data request of a second application required for network access is detected; and transmitting, when the first timer is within the second timer, request data related to the second application and user data of the first application by using at least part of the second timer and the first timer.

In accordance with another exemplary embodiment of the present invention, the present invention provides an electronic device including: a memory for storing applications; an RF communication unit for transmission/reception of data related to the applications; and a processor for controlling the RF communication unit. The processor: recognizes a data transmission request of at least one first application; determining whether a first timer according to the data transmission request is within a second timer (a data detecting timer) where a data request of a second application required for network access is detected; and transmitting, when the first timer is within the second timer, request data related to the second application and user data of the first application by using at least part of the second timer and the first timer.

BRIEF DESCRIPTION OF THE DRAWINGS

The features and advantages of the invention will become more apparent from the following detailed description in conjunction with the accompanying drawings, in which:

FIG. 6A illustrates a flow chart that describes an example method for controlling network access according to an embodiment of the present disclosure;

FIG. 7B illustrates example graphs related to the flow chart of FIG. 7A;

FIG. 8 illustrates a timing diagram that describes an example method for controlling network access according to a third embodiment of the present disclosure.

DETAILED DESCRIPTION

Figure 1:
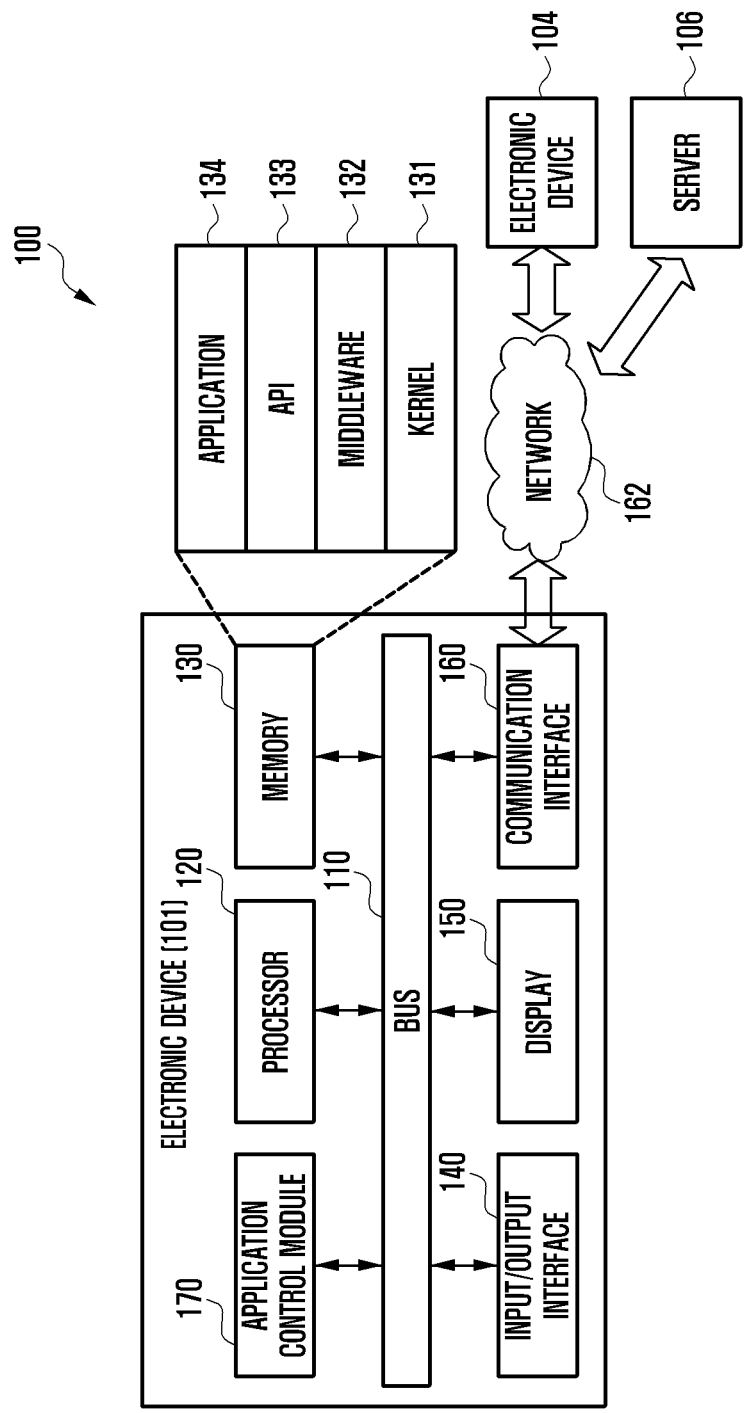
FIG. 1 illustrates a network environment including an example electronic device according to embodiments of the present disclosure.

Hereinafter, embodiments of the present disclosure will be described in detail with reference to the accompanying drawings. It will be easily appreciated to those skilled in the art that various modifications, additions and substitutions are possible from the embodiment of the present disclosure, and the scope of the invention should not be limited to the following embodiments. The embodiments of the present disclosure are provided such that those skilled in the art completely understand the invention. In the drawings, the same or similar elements are denoted by the same reference numerals even though they are depicted in different drawings.

The expressions such as "include" and "may include" which may be used in the present disclosure denote the presence of the disclosed functions, operations, and constituent elements and do not limit one or more additional functions, operations, and constituent elements. In the present disclosure, the terms such as "include" and/or "have" may be construed to denote a certain characteristic, number, step, operation, constituent element, component or a combination thereof, but may not be construed to exclude the existence of or a possibility of the addition of one or more other characteristics, numbers, steps, operations, constituent elements, components or combinations thereof.

In the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., and/or the like, may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although for both of them the first user device and the second user device are user devices. For example, a first element could be termed a second element, and similarly, a second element could be also termed a first element without departing from the scope of the present disclosure.

In the case where according to which a component is referred to as being "connected" or "accessed" to other component, it should be understood that the component is not limited to being directly connected or accessed to the other component, but also another component may exist between the component and the other component. Meanwhile, in the case where according to which a component is referred to as being "directly connected" or "directly accessed" to other component, it should be understood that there is no component therebetween.

The terms used in the present disclosure are used to describe specific various embodiments, and are not intended to limit the present disclosure. Singular forms are intended to include plural forms unless the context clearly indicates otherwise.

Unless otherwise defined, all terms including technical and/or scientific terms used herein have the same meaning as commonly understood by one of ordinary skill in the art to which the invention pertains. In addition, unless otherwise defined, all terms defined in generally used dictionaries may not be overly interpreted.

The electronic device according to the embodiments of the present disclosure may be a device including a heart rate measuring function. For example, the electronic device corresponds to a combination of at least one of the followings: a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a digital audio player (e.g., MP3 player), a mobile medical device, a camera, or a wearable device. Examples of the wearable device are a head-mounted-device (HMD) (e.g., electronic eyeglasses), electronic clothing, an electronic bracelet, an electronic necklace, an appcessory, an electronic tattoo, a smart watch, etc.

The electronic device according to the embodiments of the present disclosure may be smart home appliances with a heart rate measuring function. Examples of the smart home appliances are a television (TV), a Digital Video Disk (DVD) player, an audio system, a refrigerator, an air-conditioner, a cleaning device, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, an electronic album, or the like.

The electronic device according to the embodiments of the present disclosure may include at least one of the following: medical devices (e.g., Magnetic Resonance Angiography (MRA), Magnetic Resonance Imaging (MRI), Computed Tomography (CT), a scanning machine, an ultrasonic scanning device, etc.), a navigation device, a Global Positioning System (GPS) receiver, an Event Data Recorder (EDR), a Flight Data Recorder (FDR), a vehicle infotainment device, an electronic equipment for ships (e.g., navigation equipment, gyrocompass, etc.), avionics, a security device, a head unit for vehicles, an industrial or home robot, an automatic teller's machine (ATM), a point of sales (POS) system, etc.

The electronic device according to the embodiments of the present disclosure may include at least one of the following: furniture or a portion of a building/structure, an electronic board, an electronic signature receiving device, a projector, various measuring instruments (e.g., a water meter, an electric meter, a gas meter and a wave meter), etc., which are equipped with a heart rate measuring function, respectively. The electronic device according to the embodiments of the present disclosure may also include a combination of the devices listed above. In addition, the electronic device according to the embodiments of the present disclosure may be a flexible device. It is obvious to those skilled in the art that the electronic device according to the embodiments of the present disclosure is not limited to the aforementioned devices.

Hereinafter, electronic devices according the embodiments of the present disclosure are described in detail with reference to the accompanying drawings. In the description, the term a 'user' may be referred to as a person or a device that uses an electronic device, e.g., an artificial intelligent electronic device.

FIG. 1 illustrates a network environment including an example electronic device according to embodiments of the present disclosure. Referring to FIG. 1, the electronic device 101 may include a bus 110, a processor 120, a memory 130, an input/output (I/O) interface 140, a display 150, a communication interface 160 and an application control module 170.

The bus 110 may be a communication circuit that connects the components to each other and transfers data (e.g., control messages) between the components.

The processor 120 may receive instructions from the components (e.g., the memory 130, input/output interface 140, display 150, communication interface 160, application control module 170, etc.) via the bus 110, decode them and perform corresponding operations or data processing according to the decoded instructions.

The memory 130 may store instructions or data transferred from/created in the processor 120 or the other components (e.g., the input/output interface 140, display 150, communication interface 160, application control module 170, etc.). The memory 130 may include programming modules, e.g., a kernel 131, middleware 132, application programming interface (API) 133, application module 134, etc. Each of the programming modules may be software, firmware, hardware or a combination thereof.

The kernel 131 may control or manage system resources (e.g., the bus 110, processor 120, memory 130, etc.) used to execute operations or functions of the programming modules, e.g., the middleware 132, API 133, and application module 134. The kernel 131 may also provide an interface that can access and control/manage the components of the electronic device 101 via the middleware 132, API 133, and application module 134.

The middleware 132 may make it possible for the API 133 or application module 134 to perform data communication with the kernel 131. The middleware 132 may also perform control operations (e.g., scheduling, load balancing) for task requests transmitted from the application module 134 by methods, for example, a method for assigning the order of priority to use the system resources (e.g., the bus 110, processor 120, memory 130, etc.) of the electronic device 101 to at least one of the applications of the application module 134.

The application programming interface (API) 133 is an interface that allows the application module 134 to control functions of the kernel 131 or middleware 132. For example, the API 133 may include at least one interface or function (e.g., instruction) for file control, window control, character control, video process, etc.

In embodiments of the present disclosure, the application module 134 may include applications that are related to: SMS/MMS, email, calendar, alarm, health care (e.g., an application for measuring the blood sugar level, a workout application, etc.), environment information (e.g., atmospheric pressure, humidity, temperature, etc.), and so on. The application module 134 may be an application related to exchanging information between the electronic device 101 and the external electronic devices (e.g., an electronic device 104). The information exchange-related application may include a notification relay application for transmitting specific information to an external electronic device or a device management application for managing external electronic devices.

For example, the notification relay application may include a function for transmitting notification information, created by the other applications of the electronic device 101 (e.g., SMS/MMS application, email application, health care application, environment information application, etc.), to an external electronic device (e.g., electronic device 104). In addition, the notification relay application may receive notification information from an external electronic device (e.g., electronic device 104) and provide it to the user. The device management application can manage (e.g., to install, delete, or update): part of the functions of an external electronic device (e.g., electronic device 104) communicating with the electronic device 101, e.g., turning on/off the external electronic device, turning on/off part of the components of the external electronic device, adjusting the brightness (or the display resolution) of the display of the external electronic device, etc.; applications operated in the external electronic device; or services from the external electronic device, e.g., call service or messaging service, etc.

In embodiments of the present disclosure, the application module 134 may include applications designated according to attributes (e.g., type of electronic device) of the external electronic device (e.g., electronic device 104). For example, if the external electronic device is an MP3 player, the application module 134 may include an application related to music playback. If the external electronic device is a mobile medical device, the application module 134 may include an application related to health care. In an embodiment of the present disclosure, the application module 134 may include at least one of the following: an application designated in the electronic device 101 and applications transmitted from external electronic devices (e.g., server 106, electronic device 104, etc.).

The input/output interface 140 may receive instructions or data from the user via an input/output system (e.g., a sensor, keyboard or touch screen) and transfers them to the processor 120, memory 130, communication interface 160 or application control module 170 through the bus 110. For example, the input/output interface 140 may provide data corresponding to a user's touch input to a touch screen to the processor 120. The input/output interface 140 may receive instructions or data from the processor 120, memory 130, communication interface 160 or application control module 170 through the bus 110, and output them to an input/output system (e.g., a speaker or a display). For example, the input/output interface 140 may output voice data processed by the processor 120 to the speaker.

The display 150 may display information (e.g., multimedia data, text data, etc.) on the screen so that the user can view it.

The communication interface 160 may communicate between the electronic device 101 and an external system (e.g., an electronic device 104 or server 106). For example, the communication interface 160 may connect to a network 162 in wireless or wired mode and communicate with the external system. Wireless communication may include at least one of the following: Wireless Fidelity (Wi-Fi), Bluetooth (BT), near field communication (NFC), global positioning system (GPS) or cellular communication (e.g., LTE, LTE-A, CDMA, WCDMA, UMTS, Wi-Bro, GSM, etc.). Wired communication may include at least one of the following: universal serial bus (USB), high definition multimedia interface (HDMI), recommended standard 232 (RS-232), plain old telephone service (POTS), etc.

In an embodiment of the present disclosure, the network 162 may be a telecommunication network. The telecommunication network may include at least one of the following: a computer network, Internet, Internet of things, telephone network, etc. The protocol for communication between the electronic device 101 and the external system, e.g., transport layer protocol, data link layer protocol, or physical layer protocol, may be supported by at least one of the following: application module 134, API 133, middleware 132, kernel 131 and communication module 160.

Figure 2:
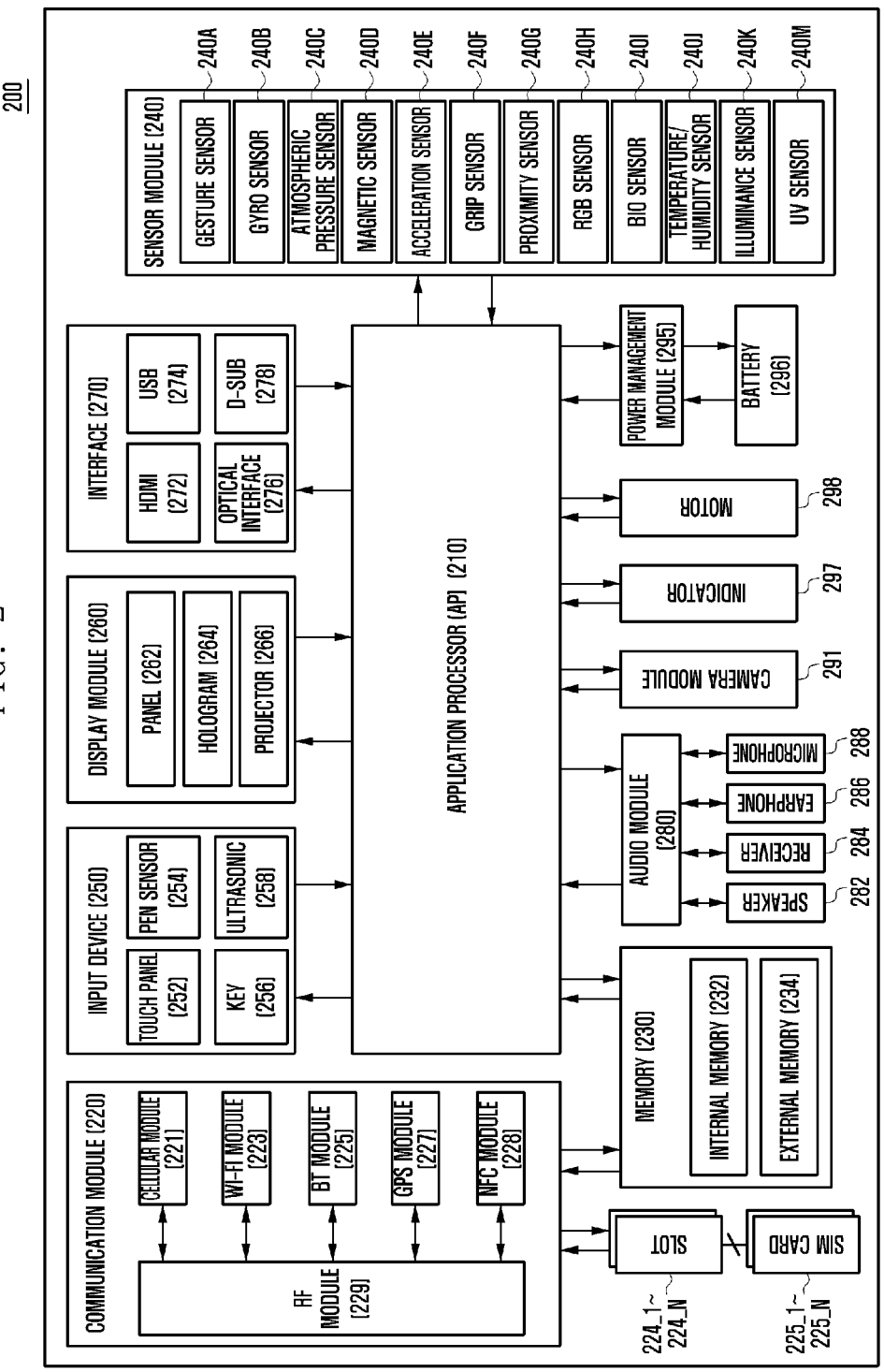
FIG. 2 illustrates a schematic block diagram of an example electronic device according to embodiments of the present disclosure.

FIG. 2 illustrates a schematic block diagram of an example electronic device according to embodiments of the present disclosure. The electronic device may be part or all of electronic device 101 as shown in FIG. 1. Referring to FIG. 2, the electronic device may include one or more processors of the application processor 210, a communication module 220, a subscriber identification module (SIM) card 224, a memory 230, a sensor module 240, an input system 250, a display module 260, an interface 270, an audio module 280, a camera module 291, a power management module 295, a battery 296, an indicator 297, and a motor 298.

The application processor (AP) 210 may control a number of hardware or software components connected thereto by executing the operation system or applications, process data including multimedia data, and perform corresponding operations. The AP 210 may be implemented with a system on chip (SoC). In an embodiment of the present disclosure, the AP 210 may further include a graphic processing unit (GPU).

The communication module 220 (e.g., communication interface 160) performs communication for data transmission/reception between the other electronic devices (e.g., an electronic device 104, server 106) that are connected to the electronic device (e.g., electronic device 101) via the network. In an embodiment of the present disclosure, the communication module 220 may include a cellular module 221, a Wi-Fi module 223, a Bluetooth (BT) module 225, a GPS module 227, an NFC module 228 and a radio frequency (RF) module 229.

The cellular module 221 may provide voice call, video call, SMS or Internet service, etc., via a communication network (e.g., LTE, LTE-A, CDMA, WCDMA, UMTS, Wi-Bro, GSM, etc.). The cellular module 221 may perform identification or authentication for electronic devices in a communication network by using their subscriber identification module (e.g., SIM card 224). In an embodiment of the present disclosure, the cellular module 221 may perform part of the functions of the AP 210. For example, the cellular module 221 may perform part of the functions for controlling multimedia.

In an embodiment of the present disclosure, the cellular module 221 may include a communication processor (CP). The cellular module 221 may be implemented with, for example, a SoC. Although the embodiment of the present disclosure shown in FIG. 2 is implemented in such a way that the cellular module 221 (e.g., communication processor), the power management module 295, the memory 230, etc., are separated from the AP 210, it can be modified in such a way that the AP 210 includes at least part of those (e.g., cellular module 221).

In an embodiment of the present disclosure, the AP 210 or the cellular module 221 (e.g., communication processor) may load instructions or data transmitted from at least one of the following: non-volatile memory or other components, on a volatile memory and then process them. The AP 210 or the cellular module 221 may also store data in a non-volatile memory, which is transmitted from/created in at least one of the other components.

The Wi-Fi module 223, the BT module 225, the GPS module 227 and the NFC module 228 may include processors for processing transmission/reception of data, respectively. Although the embodiment of the present disclosure shown in FIG. 2 is implemented in such a way that the cellular module 221, Wi-Fi module 223, BT module 225, GPS module 227, and NFC module 228 are separated from each other, it can be modified in such a way that part of those (e.g., two or more) are included in an integrated chip (IC) or an IC package. For example, part of the processors corresponding to the cellular module 221, Wi-Fi module 223, BT module 225, GPS module 227, and NFC module 228, e.g., a communication processor corresponding to the cellular module 221 and a Wi-Fi processor corresponding to the Wi-Fi 223, may be implemented with a SoC.

The radio frequency (RF) module 229 may transmit or receive data, e.g., RF signals. The RF module 229 may include a transceiver, a power amplifier module (PAM), a frequency filter, a low noise amplifier (LNA), etc. The RF module 229 may also include parts for transmitting/receiving electromagnetic waves, e.g., conductors, wires, etc., via free space during wireless communication. Although the embodiment of the present disclosure shown in FIG. 2 is implemented in such a way that the cellular module 221, Wi-Fi module 223, BT module 225, GPS module 227, and NFC module 228 share the RF module 229, it can be modified in such a way that at least one of those transmits or receives RF signals via a separate RF module.

The subscriber identification module (SIM) card 224 may be a card with a subscriber identification module (SIM). The SIM cards 224 may be fitted into a slot of the electronic device. The SIM card 224 may include unique identification information, e.g., integrated circuit card identifier (ICCID), or subscriber information, e.g., international mobile subscriber identity (IMSI).

The memory 230 (e.g., memory 130) may include built-in memory 232 and/or external memory 234. The built-in memory 232 may include at least one of the following: volatile memory, e.g., dynamic RAM (DRAM), static RAM (SRAM), synchronous dynamic RAM (SDRAM), etc.; non-volatile memory, e.g., one time programmable ROM (OT-PROM), programmable ROM (PROM), erasable and programmable ROM (EPROM), electrically erasable and programmable ROM (EEPROM), mask ROM, flash ROM, NAND flash memory, NOR flash memory, etc.

In an embodiment of the present disclosure, the built-in memory 232 may be a Sold State Drive (SSD). The external memory 234 may further include a flash drive, e.g., compact flash (CF), secure digital (SD), micro-secure digital (micro-SD), mini-secure digital (mini-SD), extreme digital (XD), a memory stick, etc. The external memory 234 may be functionally connected to the electronic device via various types of interface. In an embodiment of the present disclosure, the electronic device 101 may further include storage devices (or storage media) such as hard drives.

The sensor module 240 may measure physical quantity or sense operation states of the electronic device 101 and convert the measured or sensed data to electrical signals. The sensor module 240 may include at least one of the following: gesture sensor 240A, gyro sensor 240B, atmospheric pressure sensor 240C, magnetic sensor 240D, acceleration sensor 240E, grip sensor 240F, proximity sensor 240G, color sensor 240H (e.g., red-green-blue (RGB) sensor), biosensor 240I, temperature/humidity sensor 240J, luminance sensor 240K, and ultra-violet (UV) sensor 240M.

The input system 250 may include a touch panel 652, a pen sensor 254 (i.e., a digital pen sensor), a key 256 and an ultrasonic input system 258. The touch panel 252 may sense touches in at least one of the following: capacitive sensing mode, pressure sensing mode, infrared sensing mode, and ultrasonic sensing mode. The touch panel 252 may further include a control circuit. When the touch panel 252 is designed to operate in capacitive sensing mode, it can sense mechanical/physical touches or proximity of an object. The touch panel 252 may further include a tactile layer. In that case, the touch panel 252 can provide tactile feedback to the user.

The pen sensor 254 (i.e., digital pen sensor) may be implemented in the same or similar way as receiving a user's touch input or by using a separate recognition sheet. The key 256 may include mechanical buttons, optical keys or a key pad. The ultrasonic input system 258 is a device that can sense sounds via a microphone 288 of the electronic device 101 by using an input tool for generating ultrasonic signals and can check the data. The ultrasonic input system 258 can sense signals in wireless mode. In an embodiment of the present disclosure, the electronic device 101 may receive a user's inputs from an external system (e.g., a computer or server) via the communication module 220.

The display 260 (e.g., display 150) may include a panel 262, a hologram unit 264, or a projector 266. The panel 262 may be implemented with a Liquid Crystal Display (LCD), Active Matrix Organic Light Emitting Diodes (AMOLEDs), or the like. The panel 262 may be implemented in a flexible, transparent, or wearable form. The panel 262 may form a single module with the touch panel 252. The hologram unit 264 shows a three-dimensional image in the air using interference of light. The projector 266 may display images by projecting light on a screen. The screen may be placed, for example, inside or outside the electronic device 101. In an embodiment of the present disclosure, the display module 260 may further include a control circuit for controlling the panel 262, the hologram unit 264, or the projector 266.

The interface 270 may include a high-definition multimedia interface (HDMI) 272, a universal serial bus (USB) 274, an optical interface 276, a D-subminiature (D-sub) 278, etc. The interface 270 may also be included in the communication interface 160 shown in FIG. 1. The interface 270 may also include a mobile high-media card (MHL) interface, a secure digital (SD) card, a multi-media card (MMC) interface, an infrared data association (IrDA) standard interface, or the like.

The audio module 280 may make conversion between audios and electrical signals. At least part of the components in the audio module 280 may be included in the input/output interface 140 shown in FIG. 1. The audio module 280 may process audios output from/input to, for example, a speaker 282, a receiver 284, earphones 286, a microphone 288, etc.

The camera module 291 may take still images or moving images. In an embodiment of the present disclosure, the camera module 291 may include one or more image sensors (e.g., on the front side and/or the back side), a lens, an image signal processor (ISP), a flash (e.g., an LED or a xenon lamp), or the like.

The power management module 295 may manage electric power supplying to the electronic device 101. The power management module 295 may include a power management integrated circuit (PMIC), a charger integrated circuit (IC), a battery or fuel gauge, etc.

The PMIC may be implemented in the form of IC chip or SoC. Charging electric power may be performed in wired or wireless mode. The charger IC may charge a battery, preventing input over-voltage or input over-current from inputting to the battery from a charger. In an embodiment of the present disclosure, the charger IC may be implemented with a wired charging type and/or a wireless charging type. Examples of the wireless charging type of charger IC are a magnetic resonance type, a magnetic induction type, an electromagnetic type, etc. If the charger IC is implemented with a wireless charging type, it may include an additional circuit for wireless charging, e.g., a coil loop, a resonance circuit, a rectifier, etc.

The battery gauge may measure the residual amount of battery 296, the level of voltage, the level of current, temperature during the charge. The battery 296 charges electric power and supplies it to the electronic device 101. The battery 296 may include a rechargeable battery or a solar battery.

The indicator 297 shows states of the electronic device 101 or of the parts (e.g., AP 210), e.g., a booting state, a message state, a recharging state, etc. The motor 298 converts an electrical signal into a mechanical vibration. Although it is not shown, the electronic device 101 may include a processor for supporting a mobile TV, e.g., a graphic processing unit (GPU). The mobile TV supporting processor may process media data that comply with standards of digital multimedia broadcasting (DMB), digital video broadcasting (DVB), media flow, etc.

Each of the elements/units of the electronic device according to the present disclosure may be implemented with one or more components, and be called different names according to types of electronic devices. The electronic device according to the present disclosure may include at least one element described above. The electronic device may be modified in such a way as to: remove part of the elements or include new elements. In addition, the electronic device according to the present disclosure may also be modified in such a way that parts of the elements are integrated into one entity that performs their original functions.

Figure 3:
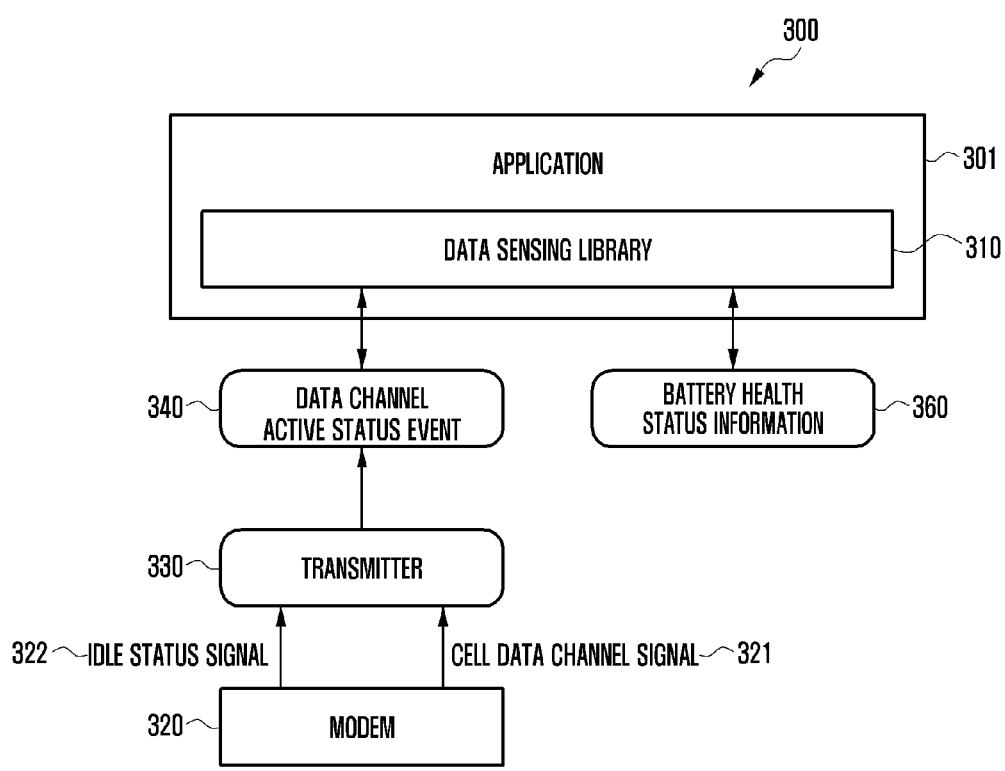
FIG. 3 illustrates a diagram of a system according to an example embodiment of the present disclosure, determining whether to access a network.

FIG. 3 illustrates a diagram of a system according to an example embodiment of the present disclosure, determining whether to access a network.

In the present disclosure, the term 'network access' refers to an operation where a data transmission requesting a signal from an application is transmitted to an embedded application or $3^{rd}$ party application, and the application transmits data related to and in response to the received request.

Referring to FIG. 3, the system 300 may include an application 301, a data sensing library 310, a modem 320, a transmitter 330, a data channel active status event 340, and a battery health status information 360.

The application 301 may be an application 134 shown in FIG. 1. The application 301 may be defined separately as a first application and a second application. First applications may refer to applications that utilize a user's explicit settings. Examples of the first application may be applications for: Social Network Service such as browsers, Facebook, Twitter, etc.; games; digital media broadcasting or DMB; online chat service such as instant messaging, one-to-one chatting, group chatting, etc.; and notification service by messages such as SMS, MMS, etc. The first application may be a foreground application.

The second application may be applications that do not require a user's explicit settings. The second application may be periodically updated to reflect a current state. Examples of the second application may be: an email widget with a Push-based e-mail client, Post Office Protocol version 3 (POP3), Internet Mail Access Protocol version 4 (IMAP4), Exchange ActiveSync (EAS), etc., and widgets for providing information such as weather, stock market price, news, etc. The second application may be a background application.

The application 301 may include data sensing library 310. The data sensing library 310 may store data request sensing intervals of applications of the application 301 respectively. The data sensing library 310 may be referenced to determine whether to perform periodic network access in a data channel active status mode or a battery health status mode. In the two modes, a channel active status event 340, battery health status information 360, and a data detecting timer event (not shown) may be registered. In the two modes, the application 301 may be monitored by using the three events listed above.

The modem 320 may monitor data channels and transmit a cell data channel signal 321 or an idle status signal 322 to the transmitter 330, indicating whether the cell data channel is active or idle.

The transmitter 330 may receive the cell data channel signal 321 and idle status signal 322 and transmit them to the application 301.

The cell data channel signal 321 may be a signal indicative of data transmission between the CPU and input/output device. In the embodiment of the present disclosure, the cell data channel signal 321 may thus indicate a state in which data can be transmitted or, where the maximum power is consumed in the electronic device. The idle status signal 322 may indicate a state in which the modem 320 or the other components/devices are idle, not sending data, or in a state where the minimum power is consumed in the electronic device. When the modem 320 transmits a cell data channel signal 321 to the application 301 via the transmitter 330, the application 301 may receive the signal 321 and perform data transmission. When the modem 320 transmits an idle status signal 322 to the application 301 via the transmitter 330, the application 301 may receive the signal 322 and refrain from performing data transmission.

The battery health status information 360 is information to detect a battery health status. The battery health status information 360 may be used to check the power level of battery, i.e., the remaining power of battery. For example, the battery health status information 360 may detect whether the battery is being charged. As such, when the battery health status information 360 detects at least one of the cases, it may be transmitted to the application 301. In addition, when the system 300 detects a location of the electronic device and ascertains that it is located in a place where the battery charging frequently occurs historically, such as, house, office, etc., battery health status information 360 reflecting the same may be transmitted to the application 301. The system 300 may be implemented in various layers, such as Application Programming Interface (API), kernel, etc.

Figure 4:
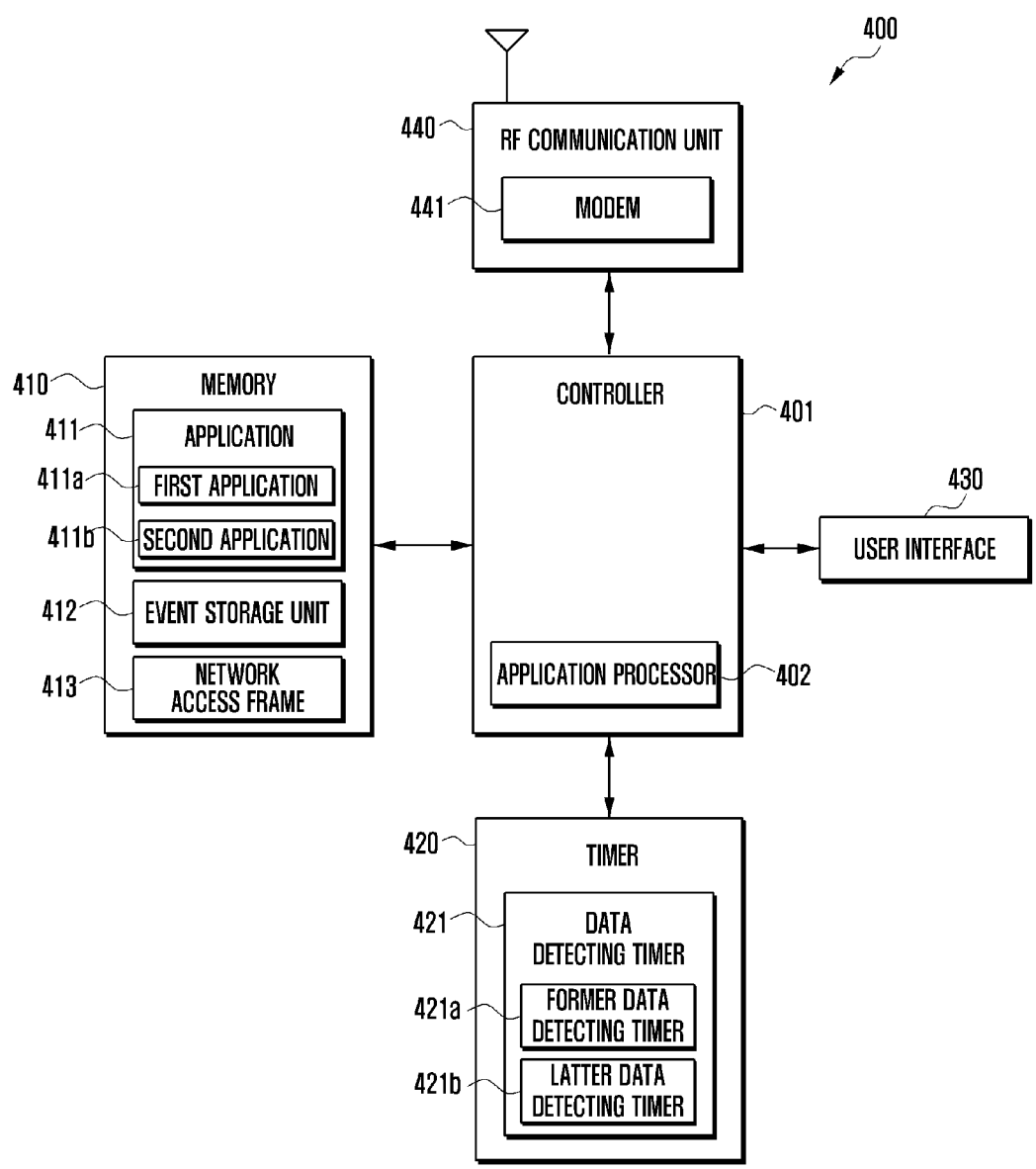
FIG. 4 illustrates a schematic block diagram of an example electronic device that reduces power consumption when accessing a network according to an embodiment of the present disclosure.

FIG. 4 illustrates a schematic block diagram of an example electronic device that reduces power consumption when accessing a network according to an embodiment of the present disclosure.

Referring to FIG. 4, the electronic device 400 may include a controller 401, a memory 410, a timer 420, a user interface 430, and an RF communication unit 440.

The controller 401 may include an application processor 402. The application processor 402 may be the application processor 210 shown in FIG. 2. The controller 401 may control the entire operation of the electronic device 400 and the signal flows among the components in the electronic device 400. The controller 401 may also perform data processing. The controller 401 may control the supply of electric power from the battery to the components. In particular, the controller 401 according to the present disclosure may control an application 411, an event storage unit 412 and a network access frame 413. The controller 401 may receive status signals of a modem 441 of the RF communication unit 440 from the modem 441 and may create the corresponding event. The event may be stored in the event storage unit 412. The controller 401 may check status of the modem 441, adjust periods of data transmission between applications 411, accesses a network and perform data transmission.

The memory 410 may be a memory 230 shown in FIG. 2. The memory 410 may store an operating system (OS) for the electronic device, applications, data such as text data, audio data, video data, etc. The memory 410 may include a program storing area and a data storing area.

The program storing area may store an operating system (OS) for booting the electronic device 400 and controlling the components of the electronic device 400, and a variety of applications 411. In particular, the program storing area according to the present disclosure may include the event storage unit 412 and the network access frame 413. The event storage unit 412 refers to a storage area for registering events for detecting statuses of second applications. The event storage unit 412 may register a data channel active event 340, a battery health status information 360, and a data detecting timer event (not shown).

The network access frame 413 manages network access periods of applications 411 installed in the electronic device 400 and detects a network request created when a network access period of an application 411 has expired. When network access frame 413 detects a network request, it requests the application processor 402 to perform transmission of data of the application 411 corresponding to the detected request. Simultaneously, the network access frame 413 may search the applications 411 for an application 411 that can perform data transmission at the same time, referring to an internal network access table, and may request the application processor 402 to perform data transmission of the searched application 411.

The timer 420 may include a data detecting timer 421. The data detecting timer 421 refers to an interval that is included in second applications 411b and in which a data request of a first application 411a or second application 411b is detected. The data detecting timer 421 may be divided into a former data detecting timer 421a and a latter data detecting timer 421b, with respect to a time point that the network access period has expired. That is, the former data detecting timer 421a may be a certain period of time before a time point that the network access period of the application 411 has expired. The latter data detecting timer 421b may be a certain period of time after a time point that the network access period of the application 411 has expired. The former data detecting timer 421a and the latter data detecting timer 421b are the same in terms of interval. For example, when a data request of a foreground 411a or background 411b application is made, the controller 401 receives a cell data channel signal 321 and detects the status of the modem 441. The controller 401 receives a status signal of the modem 441 and creates a data channel active status event 340. When the time point that the channel active event 340 occurred is within the data detecting timer 421 of the second application 411b, it means that the second application 411b may perform data transmission at the time point that the first application 411a accesses a network.

The RF communication unit 440 may be a communication module 220 shown in FIG. 2. The modem 441 may monitor data channels and transmit a cell data channel signal 321 or an idle status signal 322 to the controller 401. The RF communication unit 440 may perform a voice/video call, data communication, etc., and also receive digital broadcasts, under the control of the controller 401. The RF communication unit 440 may perform transmission/reception of data of the application 411, according to the events of the event storage unit 412 of the memory 410, under the control of the controller 401. The RF communication unit 440 includes a mobile communication module (e.g., a 3-Generation (3G) mobile communication module, 3.5G, 4G, etc.), a short-range communication module (e.g., Wi-Fi module), a digital broadcasting module (e.g., a DMB module), etc.

The user interface 430 may perform interaction with a user.

Referring to FIG. 4, the term "network access" refers to a request that the application processor 402 of the controller 401 makes to perform data transmission from the application 411 of the memory 410 or from applications of external electronic devices.

The application processor 402 of the controller 401 may receive input signals from the user interface 430. The modem 441 may receive an input signal of the user interface 430 from the application processor 402, i.e., a request signal related to the first application 411a, and transmit the transmission request the application 411. When recognizing the data request of the first application 411a, the application processor 402 detects data detecting timers 421 of second applications 411b. After the detection, the application processor 402 searches for a second application 411b with the detected data detecting timer 421 within which the time point of recognition of the request is. The corresponding second application 411b can be synchronized at the time point of recognition of the request. The application processor 402 may transmit, in order, the request data related to the second application 411b and the user data of the first application 411a to an external electronic device via the RF communication unit 440.

With the convergence of digital devices, there may be many digital devices and modifications thereof, not listed in the present disclosure, and it will be appreciated that they can also be included in the electronic device 400 according to the present disclosure. For example, the electronic device 400 may further include a GPS module, a camera module, etc. It will also be appreciated that, according to the purposes, the electronic device 400 may be implemented by omitting a particular component from the configuration or replacing it with other components.

In embodiments of the present disclosure, the data transmission apparatus of the electronic device includes: a memory for storing applications; an RF communication unit for transmission/reception of data related to the applications; and a processor for controlling the RF communication unit. The processor: recognizes a data transmission request of at least one first application; determining whether a first timer according to the data transmission request is within a second timer (a data detecting timer) where a data request of a second application required for network access is detected; and transmitting, when the first timer is within the second timer, request data related to the second application and user data of the first application by using at least part of the second timer and the first timer.

Figure 5:
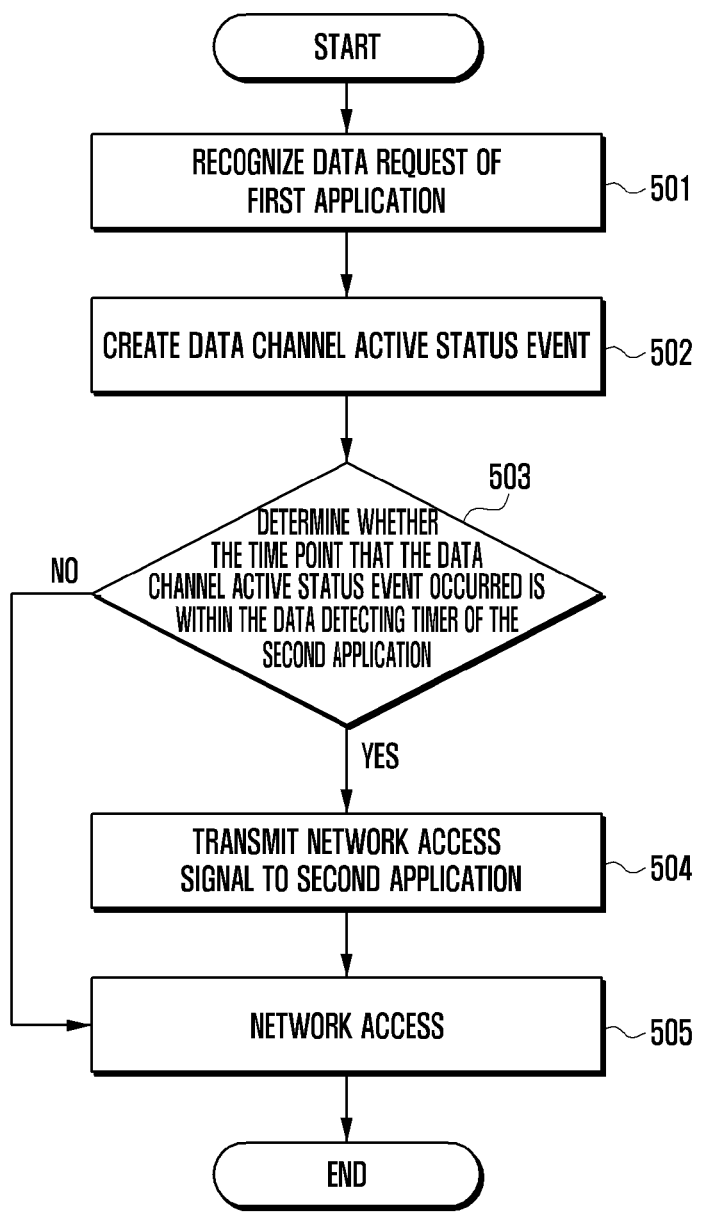
FIG. 5 illustrates a flow chart that describes an example method for controlling network access according to an embodiment of the present disclosure.

FIG. 5 illustrates a flow chart that describes an example method for controlling network access according to an embodiment of the present disclosure.

Referring to FIG. 5, the flow chart may be a process where a first application 411a and a second application 411b access a network.

The controller 401 may recognize a data request of the first application 411a (501).

When the modem 441 transmits a cell data channel signal 321 to the controller 401 via the transmitter 330, according to a data request of the first application 411a, the controller 401 receives the cell data channel signal 321 and creates a data channel active status event 340 (502).

The controller 401 determines whether the time point at which the data channel active status event 340 occurred, i.e., the recognition time point, is within the data detecting timer 421 of the second application 411b (503).

When the controller 401 ascertains that the time point that the data channel active status event 340 occurred is within the data detecting timer 421 (503), it may transmit the requested data transmission signals related to the second applications 411b (504).

After that, the controller 401 establishes network access in the second applications 411b with data detecting timers overlapping with the time point that the data channel active status event 340 occurred, and then transmits data in order (505).

On the contrary, when the controller 401 ascertains that the time point that the data channel active status event 340 occurred isn't within the data detecting timer 421 at operation 303, it proceeds with operation 505.

FIG. 6A illustrates a flow chart that describes an example method for controlling network access according to an embodiment of the present disclosure.

The controller 401 may register a network access period of a second application 411b in the network access frame 413 of the memory 410 (601).

The controller 401 may register battery health status information 360 and a data channel active status event 340 in the event storage unit 412 of the memory 410 (602).

The controller 401 may receive a battery state from the battery health status information 360 and determine whether the batter health status information 360 is created (603).

When the controller 401 ascertains that the batter health status information 360 isn't created at operation 603, it determines whether the network access period of the second application 411b has expired in the event storage unit 412 (604). When the controller 401 ascertains that the network access period of the second application 411b has not expired at operation 604, it may repeat the determination as to whether the network access period of the second application 411b has expired at operation 604.

When the controller 401 ascertains that the network access period of the second application 411b has expired at operation 604, the application processor 402 of the controller 401 may receive a cell data channel signal 321 of the modem 441. After receiving the cell data channel signal 321, the application processor 402 may create the data channel active status event 340 and register it in the event storage unit 412 (605).

The controller 401 determines whether the time point at which the data channel active status event 340 was created is within the data detecting timer 421 of the second application 411b (606).

When the controller 401 ascertains that the time point at which the data channel active status event 340 was created is within the data detecting timer at operation 606, it may transmit a request signal for corresponding data to any second applications 411b having data detecting timers overlapping at the time point at which the data channel active status event 340 occurred (607).

After that, the controller 401 may establish network access in the second application 411b, synchronizing with the time point of creation of the data channel active status event 340 and transmitting data (608). On the contrary, when the controller 401 ascertains that the batter health status information 360 isn't created at operation 603, it may proceed with operation 608.

Figure 6B:
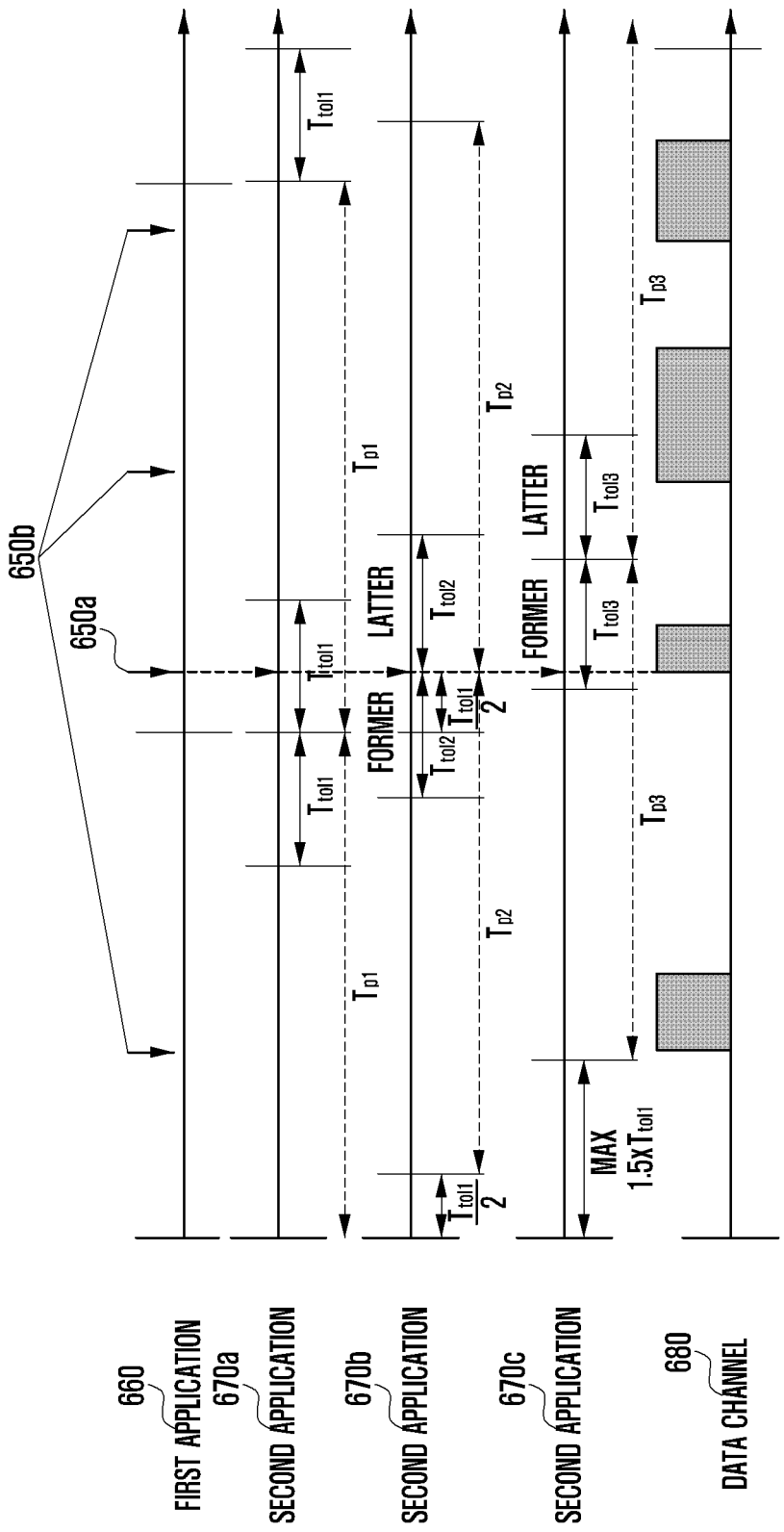
FIG. 6B illustrates an example timing diagram related to the flow chart of FIG. 6A.

FIG. 6B illustrates an example timing diagram related to the flow chart of FIG. 6A. In the following description, the terms or symbols are defined as follows.

The variable 'n' denotes the number of second applications 670. $T_{p1}, T_{p2}, \ldots, T_{pn}$ denote network access periods (indicating, for example, a periodic update time) of second applications 670a-670c. $T_{to1}, T_{to2}, \ldots, T_{ton}$ denote data detecting timers 421. The data detecting timer 421 is divided into a former data detecting timer 421a and a latter data detecting timer 421b. The former 421a and latter 421b data detecting timers may be the same in terms of interval. $T_{d1}$, $T_{d2}, \ldots, T_{an}$ denote times of data service used for applications 411, where $T_d < T_{tol}/2$.

Half of the data detecting timer 421, i.e., the former data detecting timer or the latter data detecting timer, is greater than a packet service time by an application 411.

The first application 660 may receive a user's data request and operate according to the control of the controller 401. Data requests 650a-650b may be created independently.

A number of second applications 670a-670c may have a network access period $T_{pn}$. In order to make easy network access, considering periods of applications, each application may have: a former data detecting timer 421a, $T_{toln}$, i.e., a time interval in which a request of data is made before a time point that the network access period has expired, or a latter data detecting timer 421b, $T_{toln}$, i.e., an time interval in which a request of data is made after a time point that the network access period has expired. A second application 670a may have a network access period $T_{p1}$. The second application 670a may also have a former data detecting timer 421, $T_{tol1}$, and a latter data detecting timer 421, $T_{tol1}$, before and after the time point that the network access period $T_{p1}$ has expired, respectively. A second application 670b may have an offset $T_{tol1}/2$. The second application 670b may have a network access period $T_{p2}$ after the offset $T_{tol1}/2$. The second application 670b may also have a former data detecting timer 421, $T_{tol2}$, and a latter data detecting timer 421, $T_{tol2}$, before and after the time point that the network access period $T_{p2}$ has expired, respectively. A second application 670c may have an offset less than or equal to $1.5 \times T_{tol1}$. The second application 670c may have a network access period $T_{p3}$ after the offset. The second application 670c may also have a former data detecting timer 421, $T_{tol3}$, and a latter data detecting timer 421, $T_{tol3}$, before and after the time point that the network access period $T_{p3}$ has expired, respectively.

As described above, applications 670a-670c may have network access periods, data detecting timers 421, and offsets, and perform network access as follows.

When a data request 650a is made for the first application 660, e.g., a browser, the modem 320 transmits a cell data channel signal 321 to the controller 401. The controller 401 receives the cell data channel signal 321 may create a data channel active status event 340, stored in the event storage unit 412 of the memory 410. Network access may be performed at the time point of creation of the data channel active status event 340, as follows.

The second application 670a, e.g., a weather widget, may request data transmission according to a network access period, $T_{p1}$ stored in the network access frame 413 of the memory 410. At the end of the network access period, the former and latter data detecting timers 421, $T_{tol1}$, equal to each other in terms of interval, may be created. As shown in FIG. 6B, since the time point of the data channel active status event 340 is within the latter data detecting timer 421, the second application 670a may be synchronized with the time point and transmit corresponding requested data in order.

The second application 670b may request data transmission according to a network access period, $T_{p2}$, stored in the network access frame 413 of the memory 410. At the end of one network access period, the former and latter data detecting timers 421, $T_{tol2}$, equal to each other in terms of interval, may be created. As shown in FIG. 4B, since $T_{tol2}$ is within the end of the network access period, the second application 670b may be synchronized with the time point and transmit corresponding requested data in order.

The second application 670c may request data transmission according to a network access period, $T_{p3}$, stored in the network access frame 413 of the memory 410. At the end of one network access period, the former and latter data detecting timers 421, $T_{tol3}$, equal to each other in terms of interval, may be created. As shown in FIG. 4B, since the time point of the data channel active status event 340 is within the former data detecting timer 421, the second application 670c may be synchronized with the time point and transmit corresponding requested data in order.

A data channel 680 may be active at time points that the date requests of the first application 660 are made, i.e., time points that the channel active events 340 occur. As shown in FIG. 6B, the data requests 650a-650b of the first application 660 may be made within the data detecting timer 421 of the second application 670a-670c. The data channel 680 for data requests 650b of the first application 660 may be active, separately from the second applications 670.

As shown in FIG. 6B, when the data requests 650a of the first application 660 are made within the latter data detecting timer 421 like the second application 670a, the following operations may be created selectively. The application processor 402 may store data to be transmitted at the end of the network access period of the second application 670a in a data storing area of memory 410. After that, the application processor 402 may await the next period of the second application 670a. The data of the second application 670a stored in the memory 410, may be transmitted when the data request 650a of the first application 660 is within the latter data detecting timer 421 of the second application 670a.

After establishing network access, the second applications 670 may be assigned with new network access periods $T_{p1}$, $T_{p2}, \ldots, T_{pn}$ or with previous or presently-utilized network access periods.

Figure 7A:
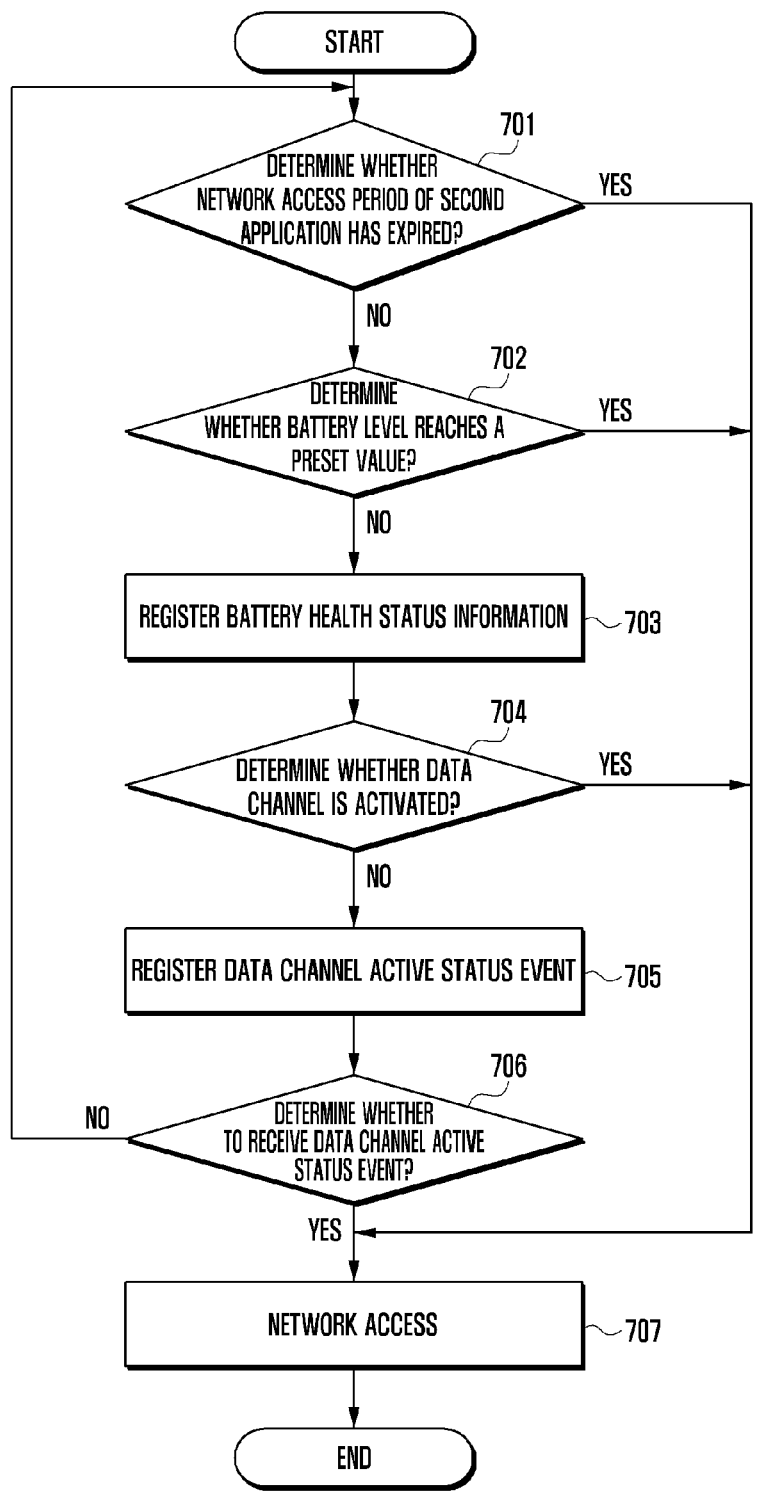
FIG. 7A illustrates a flow chart that describes an example method for controlling network access according to another embodiment of the present disclosure.

FIG. 7A illustrates a flow chart that describes an example method for controlling network access according to another embodiment of the present disclosure.

FIG. 7A is a flow chart that describes how to control network access during the latter data detecting timer 421b, compared with FIG. 6A.

The application processor 402 of controller 401 may determine whether the network access period of a second application 411b, registered in the network access frame 413, has expired (701).

When the controller 401 ascertains that the network access period of a second application 411b hasn't expired at operation 701, it may detect the battery health status information 360 and the battery health status (702). When the controller 401 ascertains that the battery is being charged, it may access a network and transmit data in order (707). On the contrary, when the controller 401 ascertains that the battery is not being charged, it may register the battery health status information 360 in the event storage unit 412 of the memory 410 (703). Registering the battery health status information 360 is performed to quickly determine the battery status later.

After registering the battery health status information 360, the application processor 402 of controller 401 may determine whether to receive a cell data channel signal 321 from the modem 441 and create a data channel active status event 340 (704). When the application processor 402 ascertains that a data channel active status event 340 isn't created at operation 504, it may register the data channel active status event 340 in the event storage unit 412 (705). Registering the data channel active status event 340 is performed to quickly determine the data channel active status later.

After registering the data channel active status event 340, the application processor 402 of controller 401 may determine whether the application 411 receives the registered data channel active status event 340 (706). When the application processor 402 ascertains that the application 411 receives the registered data channel active status event 340 at operation 706, it may establish network access and transmit data in order (707). On the contrary, when the application processor 402 ascertains that the application 411 doesn't receive the registered data channel active status event 340 at operation 706, it may return to operation 701.

Meanwhile, when the application processor 402 ascertains that the network access period of a second application 411b has expired at operation 701, it proceeds with operation 707. When the application processor 402 ascertains that the battery power reaches a preset level at operation 702, it proceeds with operation 707. When the application processor 402 ascertains that a data channel active status event 340 is created at operation 704, it proceeds with operation 707.

FIG. 7B illustrates example experimental result graphs related to the flow chart of FIG. 7A.

Referring to graph 1, experimental result graph 710 shows the activation patterns of a data channel when second applications 411b independently request data, at a time point that the channel active event 340 occurs, without accessing a network, Frequent activation of a data channel may show that the number of operations to monitor the data activation status by the modem 441 increases and thus the battery power consumption also increases.

Referring to graph 2, experimental result graph 720 shows the activation patterns of a data channel when second applications 411b accesses a network and performs data transmission while the modem 441 is activated for data transmission. As shown in graph 2, infrequent activation of a data channel means that the number of operations to monitor the data channel status by the modem 441 decreases and thus the battery power consumption also decreases.

FIG. 8 illustrates a timing diagram that describes an example method for controlling network access according to a third embodiment of the present disclosure.

The timing diagrams of FIG. 8 show network accesses by the second applications 870 when a data request 650 of the first application 411a is not made, Network access of second applications 870 may be independently performed according to the following conditions.

Condition 1: all applications 411 participating in network access have the same data detecting timer 421, $T_{tol}$, for a data active state.

Condition 2: all applications 411 participating in network access have the same network access period, $T_p$, for a data active state.

Condition 3: the offset of a range of network access period of applications 411 participating in network access satisfies $T_{tol}/2 < T_p < 1.6 \times T_{tol}$, for a data active state.

The controller 401 controls the device to keep the conditions described above. In general, a service time $T_d$ of data traffic for one time of application is based on the unit of second, and network access period Tp is based on the unit of minute.

A number of second applications 870 may have a network access period $T_{pn}$. In order to facilitate network access in the midst of these disparate periods of applications 870, each application may include former and latter data detecting timers 421, $T_{toln}$, time intervals in which requests of data are made before and after a time point that the network access period has expired, respectively. A second application 870a may have a network access period $T_{p1}$. The second application 870a may also have a former data detecting timer 421, $T_{to/1}$, and a latter data detecting timer 421, $T_{to/1}$, before and after the time point that the network access period $T_{p1}$ has expired, respectively. A second application 870b may have an offset $T_{to/1}/2$. The second application 870b may have a network access period $T_{p2}$ after the offset $T_{to/1}/2$. The second application 870b may also have a former data detecting timer 421, $T_{to/2}$, and a latter data detecting timer 421, $T_{to/2}$, before and after the time point that the network access period $T_{p2}$ has expired, respectively. A second application 870c may have an offset less than or equal to $1.6 \times T_{to/1}$. The second application 870c may have a network access period $T_{p3}$ after the offset. The second application 670c may also have a former data detecting timer 421, $T_{to/3}$, and a latter data detecting timer 421, $T_{to/3}$, before and after the time point that the network access period $T_{p3}$ has expired, respectively.

As described above, applications 870 may have network access periods, data detecting timers 421, and offsets, and perform network access, as follows, when the data request 650 of the first application 660 isn't made.

In the embodiment of the present disclosure, the second application 870a serves as the first application 660 shown in FIG. 6B. A data request 850 may be made at the time point that the network access period of the second application 870a has expired or the data detecting timer 421 has expired.

The application processor 402 may detect the time point that the network access period $T_{p1}$ of the second application 870 has expired, via the network access frame 413 of the memory 410. The application processor 402 may also detect the time point that the data detecting timer 421 $T_{to/1}$ of the second application 870 has expired, via the timer 420.

A data request 850 of the second application 870a is made at the time point that the data detecting timer 421 of the second application 870a has expired. The modem 441 transmits a cell data channel signal 321 to the controller 401. The controller 401 receives the cell data channel signal 321 and creates a data channel active status event 340 stored in the event storage unit 412. Network access may be performed at the time point of creation of the data channel active status event 340, as follows.

The second application 870b may request data transmission at a network access period, $T_{p2}$, stored in the network access frame 413 of the memory 410. At the end of one network access period, the former and latter data detecting timers 421, $T_{to/2}$, equal to each other in terms of interval, may be created. As shown in FIG. 6, since the time point of the data channel active status event 340 is within the latter data detecting timer 421b, the second application 870b may be synchronized with the time point and transmit data in order.

The second application 870c may request data transmission at a network access period, $T_{p3}$, stored in the network access frame 413 of the memory 410. At the end of one network access period, the former and latter data detecting timers 421, $T_{to/3}$, equal to each other in terms of interval, may be created. As shown in FIG. 6, since the time point of creation of the data channel active status event 340 is within the former data detecting timer 421a, the second application 870c may be synchronized with the time point and transmit corresponding requested data in order.

As shown in FIG. 8, when the data request 850 of the second application 870a is made within the latter data detecting timer 421 like the second application 870b, the following operations may be created selectively. The application processor 402 may store data to be transmitted at the end of the network access period of the second application 870*b* in the memory 410 of the second application 870*b*. After that, the application processor 402 may wait for the next period of the second application 870*b*. The data of the second application 870*b*, stored in the memory 410, may be transmitted when the data request 660 of the second application 870*a* is within the latter data detecting timer 421*b* of the second application 870*b*.

After accessing the network, the second applications 870 may be executed with new network access periods $T_{p1}, T_{p2}, \ldots, T_{pn}$ or in the same, previous network access periods.

In another embodiment of the present disclosure, when the data request 850 of the second application 870*a* is made within the latter data detecting timer 421*b* of the second application 870*b*, the following operations may be created selectively. Data to be transmitted at the end of the network access period of the second application 870*b* is stored in the memory 410 of the second application 870*b*. After that, the second application 870*b* may process the following operations. The data of the second application 870*b*, stored in the memory 410, may be transmitted when the data request 850 of the second application 870*a* is within the latter data detecting timer 421*b* of the second application 870*b*.

After establishing network access, the second applications 870 may be processed with new network access periods $T_{p1}, T_{p2}, \ldots, T_{pn}$ or with the previous network access periods.

Since the number of requests for data of the second applications 870 can be minimized, the electronic device according to the invention reduces the battery power consumption.

Figure 9:
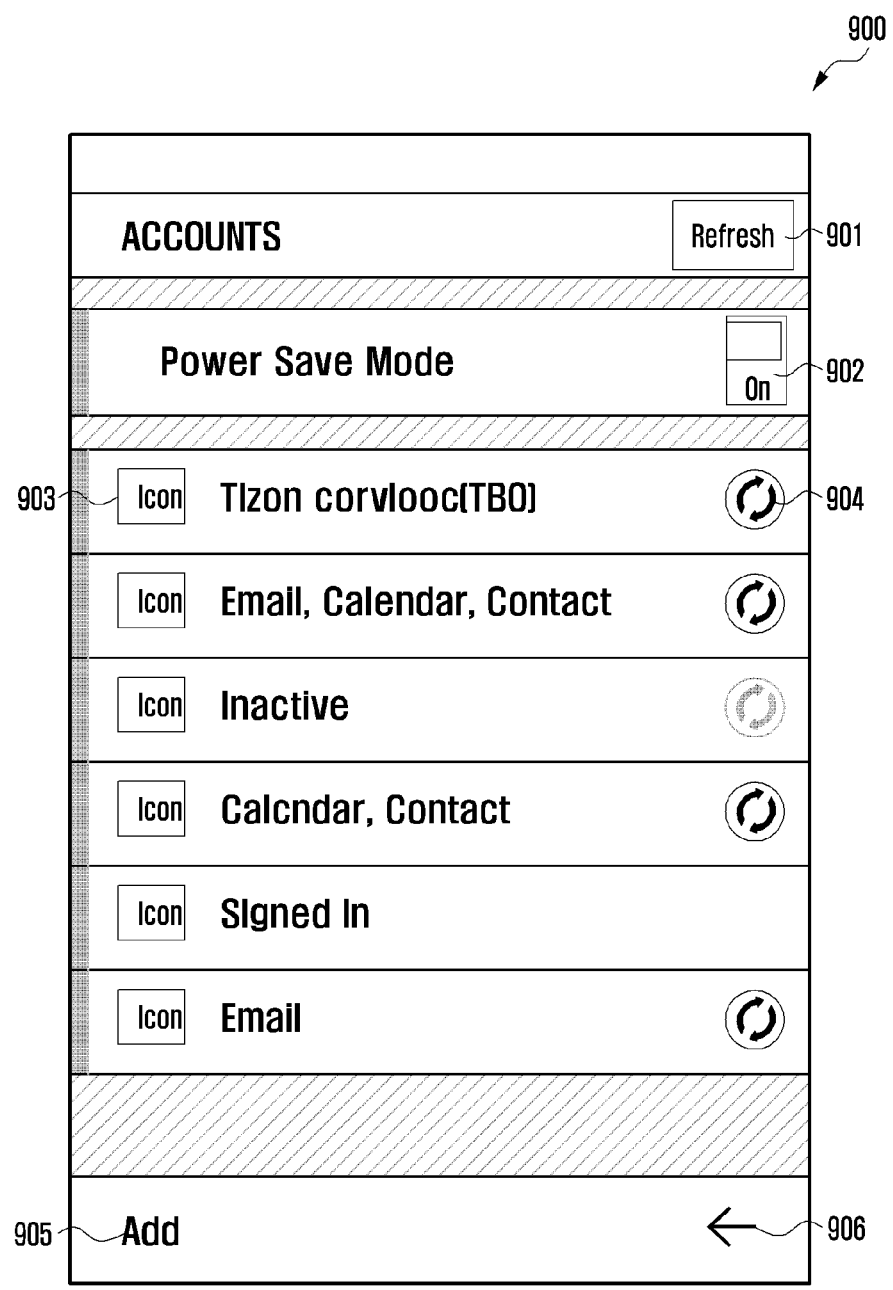
FIG. 9 illustrates a diagram that describes an example user experience (UX) for network access of an electronic device according to a third embodiment of the present disclosure.

FIG. 9 illustrates a diagram that describes an example user experience (UX) for network access of an electronic device according to a third embodiment of the present disclosure.

User experience (UX) is described as follows referring to FIG. 9.

As an example, a screen shows a UX system. The UX system may provide "Refresh" tab 901, "On/OFF" tab 902, second application list 903, network access state notification 904, "Add" tab 905, and "Back" tab 906.

"Refresh" tab 901 may be at the top right on the screen. "Refresh" tab 901 rearranges a list of applications when an application 411*b* to be synchronized is add to/removed from the list by operating it.

"On/OFF" tab 902 turns the UX system on/off according to a user's operation. When the user operates "On/Off" tab 902 to turn it on, the electronic device sets an optimal network access period for a registered second application 411*b*, and transmits data, in order, at the same network access time point.

The second application list 903 may include second applications 411*b* that are periodically updated. The second applications 411*b* have network access state notification 704 that the user can operate to perform network access, respectively. The network access state notification 904 shows whether corresponding second applications 411*a* are accessed to a network so that the user can easily recognize the network access status. FIG. 9 shows an email as a second application 411*b*.

"Add" tab 905 allows the user to add a second application 411*b* that he/she wants to be accessed a network at the same time point. "Back" tab 906 allows the user to return to the previous screen.

When the electronic device user executes Power Save Mode on the UX screen as shown in FIG. 9, the controller 401 may set optimal network access periods for registered applications on the list 903 and perform network access. The controller 401 may automatically, adaptively adjust network access periods. This can reduce the battery power consumption. The electronic device according to the present disclosure control network access periods of applications to optimal values, automatically and respectively, compared to conventional system where users manually set them, and provide the UX as shown in FIG. 9 on the screen, thereby reducing the battery power consumption.

In embodiments of the present disclosure, the data transmission method of an electronic device includes: recognizing a data transmission request of at least one first application; determining whether a first timer according to the data transmission request is within a second timer (a data detecting timer) where a data request of a second application required for network access is detected; and transmitting, when the first timer is within the second timer, request data related to the second application and user data of the first application by using at least part of the second timer and the first timer.

As described above, the data transmission method and the electronic device according to the embodiments of the present disclosure can allow the user to firmly transmit data of first applications within a preset time interval. During the data transmission, the data transmission method and the electronic device can make network access with a second application and also transmit requested data related to the second application, thereby reducing power consumption.

In the present disclosure, the terminology '~module' refers to a 'unit' including hardware, software, firmware or a combination thereof. For example, the terminology '~module' is interchangeable with '~unit,' '~logic,' '~logical block,' '~component,' '~circuit,' etc. A 'module' may be the least unit or a part of an integrated component. A 'module' may be the least unit or a part thereof that can perform one or more functions. A 'module' may be implemented in mechanical or electronic mode. For example, 'modules' according to the embodiments of the present disclosure may be implemented with at least one of the following: an application specific integrated circuit (ASIC) chip, field-programmable gate array (FPGAs) and a programmable-logic device that can perform functions that are known or will be developed.

At least part of the method (e.g., operations) or system (e.g., modules or functions) according to the embodiments of the present disclosure can be implemented with instructions as programming modules that are stored in computer-readable storage media. One or more processors (e.g., processor 201) can execute instructions, thereby performing the functions. An example of the computer-readable storage media may be memory 220. At least part of the programming modules can be implemented (executed) by processor 210. At least part of the programming module may include modules, programs, routines, sets of instructions or processes, etc., in order to perform one or more functions.

Examples of computer-readable media include: magnetic media, such as hard disks, floppy disks, and magnetic tape; optical media such as Compact Disc Read Only Memory (CD-ROM) disks and Digital Versatile Disc (DVD); magneto-optical media, such as floptical disks; and hardware devices that are specially configured to store and perform program instructions (e.g., programming modules), such as read-only memory (ROM), random access memory (RAM), flash memory, etc. Examples of program instructions include machine code instructions created by assembly languages, such as a compiler, and code instructions created by a high-level programming language executable in computers using an interpreter, etc. The described hardware devices may be configured to act as one or more software modules in order to perform the operations and methods described above, or vice versa.

Modules or programming modules according to the embodiments of the present disclosure may include one or more components, remove part of them described above, or include new components. The operations performed by modules, programming modules, or the other components, according to the present disclosure, may be executed in serial, parallel, repetitive or heuristic fashion. Part of the operations can be executed in any other order, skipped, or executed with additional operations.

As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that a "processor" or "microprocessor" constitute hardware in the claimed invention. Under the broadest reasonable interpretation, the appended claims constitute statutory subject matter in compliance with 35 U.S.C. §101.

Although example embodiments of the invention have been described in detail above, it should be understood that many variations and modifications of the basic inventive concept herein described, which may be apparent to those skilled in the art, will still fall within the spirit and scope of the example embodiments of the invention as defined in the appended claims.

What is claimed is:

1. A data transmission method of an electronic device comprising:
    recognizing a data transmission request of at least one first application;
    determining whether a first timer according to the data transmission request is within a second timer, which is a data detecting timer, where a data request of a second application required for network access is detected; and
    transmitting, when the first timer is within the second timer, request data related to the second application and user data of the first application by using at least part of the second timer and the first timer.

2. The method of claim 1, wherein the determination comprises:
    determining, when a channel active status event occurs, whether a first timer according to the data transmission request is within a second timer where a data request of a second application required for network access is sensed.

3. The method of claim 2, further comprising:
    storing the channel active event for determining whether a data channel is activated; battery health status information for checking a battery health status; or a data detecting timer event for determining whether the data detecting timer has expired at an expiration time point of the second application.

4. The method of claim 3, wherein the request data related to the second application and the user data of the first application is not transmitted when the condition of occurrence of the channel active event is a state where the battery is being charged or a state where the electronic device is located at a place where the battery is charged.

5. The method of claim 1, wherein the data detecting timer comprises:
    former and latter data detecting timers, equal to each other in terms of time interval, before and after a time point that a network access period of the requested data has expired.

6. The method of claim 1, wherein the transmission of requested data and user data comprises:
    transmitting the request data and the user data in at least part of a timer where the second timer and the first timer are overlapped.

7. The method of claim 1, wherein the transmission of requested data and user data comprises:
    creating and storing the requested data at a time point that a network access period of the requested data has expired; and
    transmitting, when the time point that the data transmission request is recognized is within the second timer, the stored, requested data and the user data.

8. The method of claim 1, wherein the transmission of requested data and user data comprises:
    creating, when the first timer is within the second timer, the requested data before a time point that a network access period of the requested data has expired; and
    transmitting the previously created, requested data and the user data.

9. The method of claim 1, further comprising:
    transmitting the user data when the first timer isn't within the second timer.

10. The method of claim 1, wherein the recognition of a data transmission request comprises:
    recognizing a data transmission request when a network access period of the second application has expired.

11. An electronic device comprising:
    a memory for storing applications;
    an RF communication unit for transmission/reception of data related to the applications; and
    a processor for controlling the RF communication unit,
    wherein the processor: recognizes a data transmission request of at least one first application; determining whether a first timer according to the data transmission request is within a second timer, which is a data detecting timer, where a data request of a second application required for network access is detected; and transmitting, when the first timer is within the second timer, request data related to the second application and user data of the first application by using at least part of the second timer and the first timer.

12. The electronic device of claim 11, wherein the processor determines, when a channel active status event occurs, whether a first timer according to the data transmission request is within a second timer where a data request of a second application required for network access is sensed.

13. The electronic device of claim 12, wherein the processor stores: the channel active event for determining whether a data channel is activated; battery health status information for checking a battery health status; or a data detecting timer event for determining whether the data detecting timer has expired at an expiration time point of the second application.

14. The electronic device of claim 13, wherein the processor does not transmit the request data related to the second application and the user data of the first application when the condition of occurrence of the channel active event is a state where the battery is being charged or a state where the electronic device is located at a place where the battery is charged.

15. The electronic device of claim 11, wherein the data detecting timer comprises:
former and latter data detecting timers, equal to each other in terms of time interval, before and after a time point that a network access period of the requested data has expired.

16. The electronic device of claim 11, wherein the processor transmits the request data and the user data in at least part of a timer where the second timer and the first timer are overlapped.

17. The electronic device of claim 11, wherein the processor creates and stores the requested data at a time point that a network access period of the requested data has expired; and transmits, when the time point that the data transmission request is recognized is within the second timer, the stored, requested data and the user data.

18. The electronic device of claim 11, wherein the processor: creates, when the first timer is within the second timer, the requested data before a time point that a network access period of the requested data has expired; and transmits the previously created, requested data and the user data.

19. The electronic device of claim 11, wherein the processor transmits the user data when the first timer is not within the second timer.

20. The electronic device of claim 11, wherein the processor recognizes a data 15 transmission request when a network access period of the second application has expired.

* * * * *